United States Patent
Waugh et al.

(10) Patent No.: US 9,255,580 B2
(45) Date of Patent: Feb. 9, 2016

(54) SYSTEMS AND METHODS FOR OPERATING AND VALIDATING A COMPRESSOR

(71) Applicant: General Electric Company, Schenectady, NY (US)

(72) Inventors: Daniel Richard Waugh, Greenville, SC (US); Karl Dean Minto, Schenectady, NY (US); Scott William Szepek, Schenectady, NY (US); Louis Veltre, Greenville, SC (US)

(73) Assignee: General Electric Company, Schenectady, NY (US)

( * ) Notice: Subject to any disclaimer, the term of this patent is extended or adjusted under 35 U.S.C. 154(b) by 538 days.

(21) Appl. No.: 13/630,694

(22) Filed: Sep. 28, 2012

(65) Prior Publication Data
US 2014/0093349 A1    Apr. 3, 2014

(51) Int. Cl.
*F04D 27/00* (2006.01)
*G01M 15/14* (2006.01)
*F04D 27/02* (2006.01)

(52) U.S. Cl.
CPC .......... *F04D 27/001* (2013.01); *F04D 27/0253* (2013.01); *G01M 15/14* (2013.01)

(58) Field of Classification Search
CPC ... F04D 27/001; F04D 27/0253; G01M 15/14
USPC ...................................... 415/1, 20
See application file for complete search history.

(56) References Cited

U.S. PATENT DOCUMENTS

| | | | |
|---|---|---|---|
| 6,464,470 B1* | 10/2002 | Zamudio et al. | 417/297 |
| 2010/0152918 A1* | 6/2010 | Riverin | 700/301 |
| 2012/0100011 A1* | 4/2012 | Sommer et al. | 417/44.1 |
| 2012/0121376 A1* | 5/2012 | Huis In Het Veld | 415/1 |

FOREIGN PATENT DOCUMENTS

DE    10 2080 031274 B3    10/2009

OTHER PUBLICATIONS

Russ Martin, et al., "GE's Next 7FA Gas Turbine 'Test and Validation'", http://www.ge-energy.com/content/multimedia/_files/downloads/GEA18457A_7FA_GI_7-27-11_rl.pdf), Nov. 18, 2013.
Ingolf Krenz, "Compressor Rig Testing At MTU Aero Engines: Testbed/Instrumentation/Data Acquisition", Aerospance Testing Expo—May 19, 2010, http://www.mtu.de/en/technologies/engineering_news/develoopment/Krenz_Compressor_Rig_Testing-en.pdf, Nov. 18, 2013.
U. Orth, et al., "Improved Compressor Exit Diffuser for an Industrial Gas Turbine", Journal of Turbomachinery, vol. 124, No. 1, Jan. 1, 2002, Germany.
(Continued)

*Primary Examiner* — Edward Look
*Assistant Examiner* — Danielle M Christensen
(74) *Attorney, Agent, or Firm* — Sutherland Asbill & Brennan LLP (57) ABSTRACT

Certain embodiments of the disclosure may include systems, methods and apparatus for operating and validating a compressor. According to an example embodiment of the disclosure, a method is provided for validating compressor operation. The method can include receiving compressor operating parameter data from a plurality of sensors; and adjusting a portion of a variable flow area downstream of a compressor discharge to achieve a desired compressor pressure ratio.

18 Claims, 4 Drawing Sheets

(56) References Cited

OTHER PUBLICATIONS

T. Raitor, "Centrifugal Compressor Test Rig SRV—Overview SRV Impleller and Diffuser SRV—Technical Data", http://messtec.dlr.de/en/pdf/technology/dlr-propulsion-technology/centrifugal-compressor-test-rig/index.php, Nov. 18, 2011.

International search report issued in connection with PCT/US2013/055652, Nov. 26, 2013.

* cited by examiner

SYSTEMS AND METHODS FOR OPERATING AND VALIDATING A COMPRESSOR

TECHNICAL FIELD

This disclosure generally relates to power generation systems and in particular to systems and methods for operating and validating a compressor.

BACKGROUND

Compressors are typical power generation components for conventional power generating stations. Effective testing and validation of a compressor can increase the efficiency and productivity of the overall power generating station. In conventional power generating stations, validating a compressor can be an expensive and time consuming process wherein the compressor's operation must be evaluated over a wide range of operational test points.

BRIEF DESCRIPTION OF THE DISCLOSURE

Some or all of the above needs may be addressed by certain embodiments of the disclosure. Certain embodiments of the disclosure may include systems and methods for operating and validating a compressor. According to an example embodiment of the disclosure, a method for validating compressor operation can be provided. The method can include receiving compressor operating parameter data from a plurality of sensors; and adjusting a portion of a variable flow area downstream of a compressor discharge to achieve a desired compressor pressure ratio.

According to another example embodiment, a system can be provided for validating compressor operation. The system can include a plurality of sensors operable to receive compressor operating parameter data. Further, the system can include a processor operable to receive the compressor operating parameter data. The system can also include one or more throttling devices operable to modulate a variable flow area downstream from a compressor discharge; wherein the processor is operable to modulate the one or more throttling devices to achieve a desired compressor discharge pressure ratio or compressor speed.

According to yet another embodiment, one or more computer-readable media can be provided. The computer-readable media can store computer-executable instructions that, when executed by at least one processor, configure at least one processor to perform certain operations. The operation can include receiving compressor parameter data from a plurality of sensors; and adjusting a portion of the variable flow area downstream from a compressor discharge to achieve a desired compressor pressure ratio.

Other embodiments, features, and aspects of the disclosure are described in detail herein and are considered a part of the claimed disclosure. Other embodiments, features, and aspects can be understood with reference to the following detailed description, accompanying drawings and claims.

BRIEF DESCRIPTION OF THE FIGURES

References will now be made to the accompanying figures and flow diagrams, which are not necessarily drawn to scale, and wherein.

DETAILED DESCRIPTION OF THE DISCLOSURE

Example embodiments of the disclosure now will be described more fully hereinafter with reference to the accompanying drawings, in which some, but not all embodiments are shown. Indeed, the disclosure may be embodied in many different forms and should not be construed as limited to the embodiments set forth herein rather; these embodiments are provided so that this disclosure will satisfy applicable legal requirements. Like numbers refer to like elements throughout.

According to an example embodiment of the disclosure, validating a compressor can be achieved by modulating a discharge area of the compressor. By modulating, varying, or otherwise controlling the discharge area of the compressor, one can simulate compressor operation when the compressor operates in conjunction with a turbine in a power generating station. Controlling the discharge area can be accomplished by using a computer processor with one or more computer-executable instructions. The instructions can include any number of control modes. In one embodiment, a control mode can be governed by an algorithm operable to calculate a compressor pressure ratio (CPR). The computer processor may use any number of control modes to adjust the variable flow area downstream of the compressor discharge to achieve a desired CPR. The control modes can include, but are not limited to, closed loop pressure ratio control; manual control of the portion of the variable flow area; and dynamic control of the portion of the variable flow area.

Technical effects or solutions can be accomplished by certain embodiments of the disclosure, for example, by using a computer processor with one or more computer-executable instructions, to control the discharge area of a compressor, wherein any number of control modes can be facilitated. In certain instances, the technical effect or solution of operating and/or validating a compressor using a particular control mode can be facilitated by operating at a predefined compressor pressure ratio (CPR).

Figure 1:
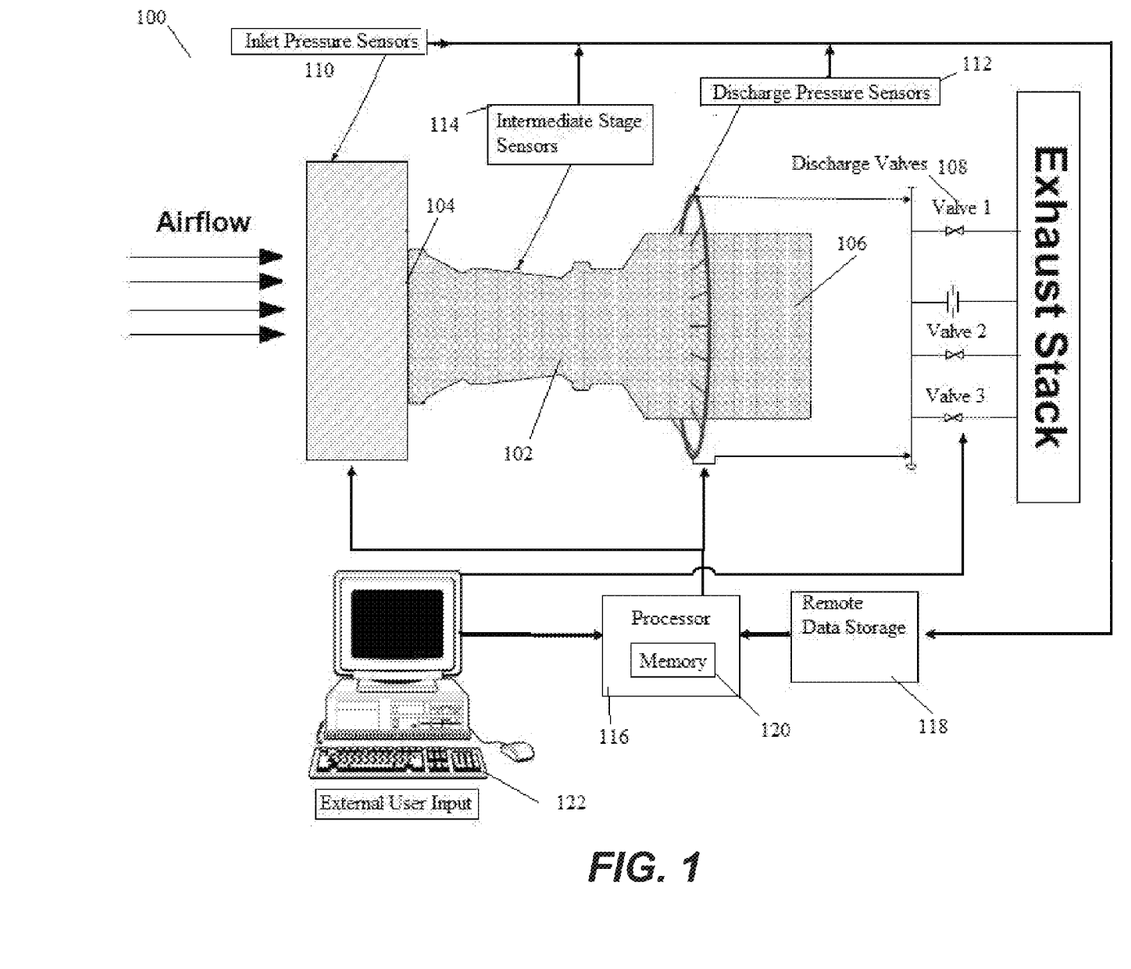
FIG. 1 is a schematic diagram of an example system according to an example embodiment.

Referring to the drawings, FIG. 1 is a schematic view of an example system 100 that can include a compressor 102 with an inlet 104 and a discharge 106. The system 100 can utilize various types of compressors, such as, but not limited to, axial-type, centrifugal-type, or screw-type configurations. During operation of the compressor 102, the compressor 102 can receive gas or fluid flow through the inlet 104, and can deliver a compressed gas or fluid flow to the discharge 106. As the gas or fluid flow exits the discharge 106, the gas or fluid flow rate exiting the discharge 106 can be controlled by one or more modulating devices, such as valves 108.

The valves 108 shown in this embodiment can modulate the gas or fluid flow rate by increasing or decreasing a respective aperture size associated with each valve. Generally, the change in valve aperture size is inversely proportional to the pressure of the gas or fluid exiting the discharge. Thus, increasing the valve aperture size lowers the pressure of the gas or fluid at the discharge 106. The configuration of valves 108 in FIG. 1 is shown as a series of 3 valves in a parallel orientation with each other from a common header connected to an annular ring around the compressor discharge 106. Other types and/or configurations of modulation devices and/or valves can exist in other embodiments of the disclosure.

The system 100 can also include any number of sensors, such as 110, 112, 114, operable to obtain or otherwise receive compressor operating parameter data. In the embodiment shown in FIG. 1, the sensors 110, 112, 114 can capture compressor operating parameters, including, but not limited to, dynamic fluid pressure, fluid flow rate, and compressor speed. The sensors 110, 112, 114 can be respectively located or otherwise positioned at the inlet 104 and discharge 106 of the compressor 102. In certain embodiments, any number of intermediate sensors 114 can be located or otherwise positioned between the inlet 104 and discharge 106. In any instance, compressor operating parameter data obtained or otherwise received by the sensors 110, 112, 114 can be transmitted to a computer processor 116. In one embodiment, compressor operating parameter data can be transmitted to a remote storage device 118 for storage, wherein the remote storage device 118 can be externally coupled to the computer processor 116. In some embodiments, a storage device, such as memory 120, may exist physically inside the processor 116. In any instance, the storage device 118 may include, but not be limited to, random access memory (RAM), a hard drive, optical disk, magnetic tape, or other similar types of data storage.

The computer processor 116 shown in FIG. 1 can be operable to communicate with the remote storage device 118 and/or memory 120 to execute one or more computer-executable instructions operable to calculate a compressor pressure ratio (CPR) associated with the compressor 102. In one embodiment, the CPR can be calculated using a formula, such as: (Pressure (2)−Pressure (1))/Pressure (2), wherein Pressure (1) can be measured at the inlet 104, and Pressure (2) can be measured at the discharge 106.

In the embodiment shown, the computer processor 116 can control the pressure of the gas or fluid exiting the discharge 106 by sending a signal to adjust one or more of the valves 108. In another embodiment, an external user interface, such as 122 can generate and transmit a signal to the computer processor 116 to adjust one or more of the valves 108. In another embodiment, the external user interface 122 can be operable to implement a direct adjustment to one or more of the valves 108 without a signal input from the computer processor 116.

The external user interface 122 shown in FIG. 1, can include, but is not limited to, a processor-based device, a computer, a tablet, a laptop computer, a server, a mainframe computer, or any other similar type device for receiving a user input.

Figure 2:
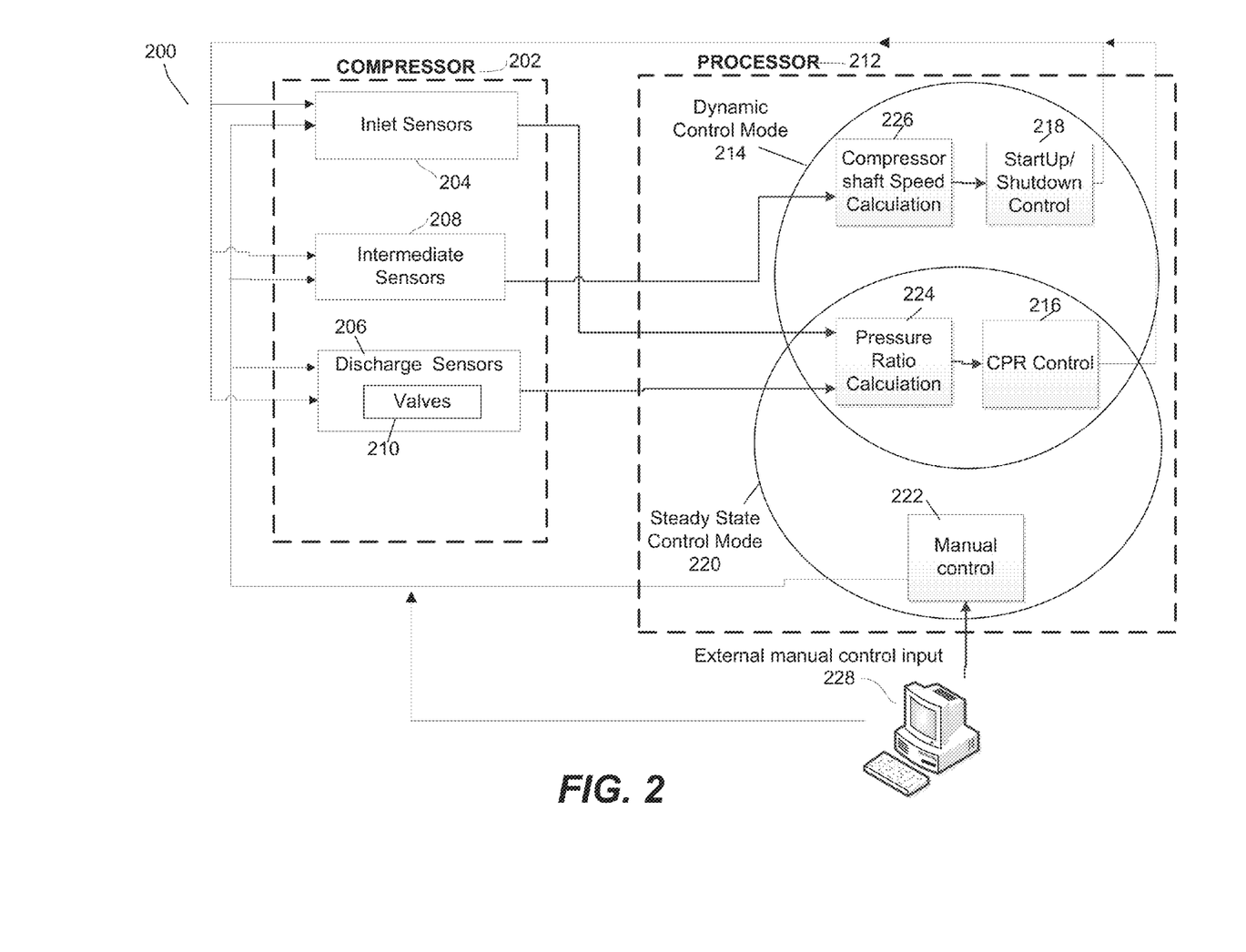
FIG. 2 is a schematic diagram of an example processor/controller and associated system components according to an example embodiment.

FIG. 2 illustrates an example processor/controller and associated system components 200 in accordance with an embodiment of the invention. In the embodiment shown in FIG. 2, data acquisition and processing of a compressor operating system can include a compressor 202, sensors 204, 206, 208, valves 210, a processor 212, and an external manual control input device 228. As the compressor 202 operates, the sensors 204, 206, 208 receive compressor operating data. The sensor data can be received by the processor 212. The processor 212 can be operable to control subsequent operation of the compressor 202 using at least one control mode. For example, the processor 212 can initiate an algorithm which receives the data from the sensors 204, 206, 208 and sends a modulating signal to the valves 210.

The compressor 202, as shown in FIG. 2, can be operable to compress a fluid or gas as the fluid or gas enters and exits the compressor 202. The compressor 202 can function in a transient state or steady state. For example, transient state operation can occur when the compressor speed is variable, wherein the compressor is accelerating to full operational speed or decelerating from full operational speed. Steady state operation can occur when the compressor speed is at full constant speed.

As shown in FIG. 2, sensors 204, 206, 208 can be placed at multiple locations on the compressor 202. For example, sensors can be placed at the inlet 204 and discharge 206. In the embodiment shown, sensors can be placed on the compressor in an intermediate position 208 at locations between the inlet 204 and discharge 206. Further, the sensors 204, 206, 208 can be operable to receive any type of compressor operating data, including but not limited to fluid pressure, fluid flow rate and compressor speed. In another embodiment, the sensors 204, 206, 208 can be dynamic pressure sensors.

The valves 210 shown in this embodiment can modulate gas or fluid flow rate by increasing or decreasing an aperture size. The operation of valves 210 can be controlled by the inputs received by the processor 212. As shown in FIG. 2, the processor 212 can both receive inputs from the compressor sensors 204, 206, 208 and send output to the sensors 204, 206, 208 and valves 210. The output provided by the processor 212 can control the compressor operation. Further, the output generated by the processor 212 can be determined from a control mode. When the compressor 202 operates in the transient state, the processor 212 can control the compressor 202 using dynamic control modes 214. The dynamic control modes 214 can include but are not limited to closed loop CPR control 216 and open loop startup/shutdown control 218. When the compressor 202 operates in the steady state, processor 212 can control the compressor 202 using steady state control modes 220. The steady state control modes 220 can include, but are not limited to, closed loop CPR 216 and open loop manual control 222.

As shown in FIG. 2, the compressor 202 can operate in steady state, and the processor 212 can initiate a steady state control mode 220. When the processor 212 operates in closed loop CPR control 216, the processor 212 can receive inputs from the sensors 204, 206, 208 to calculate the CPR process variable 224. The CPR calculation 224 can be made by evaluating the pressure ratio of two points located in the compressor 202. In one embodiment, the processor 212 can calculate the pressure ratio using the pressure measurements at the inlet 204 and discharge 206 of the compressor 202. The CPR 224 can be stored and compared to preset values, or set points. Further, divergence from the preset value can initiate an automatic adjustment to vary fluid flow downstream from the compressor discharge.

In another embodiment, the compressor 202 can be operated at steady state speed, and the processor can be governed by open loop manual control 222. In this embodiment, the manual control 222 can supersede a prompt to adjust the valves based on the CPR process variable 224 used to control other modes. The manual input to the valves 210 can be provided by an external manual input device 228 either via the manual control 222 or directly by the external manual input device 228. The external manual input device 228 may include, but is not limited to, a keyboard, touch screen, mouse, push button, knob, dial, or similar type of input device.

In another embodiment, the processor 212 can control the compressor using dynamic control 214, wherein dynamic control 214 can operate using an open loop or closed loop control algorithm. Dynamic control 214 can be applied when the compressor 202 is operating in the transient state. Further, closed loop operation under dynamic control 214 can also use a process variable, such as the CPR process variable 216, to modulate the aperture of the discharge valves 210.

In another embodiment, the open loop dynamic control can be controlled in an open loop startup/shutdown control 218 wherein the compressor shaft speed 226 can be directly correlated to pre-set valve apertures. When the compressor 202 accelerates and decelerates, the compressor shaft speed 226 can serve as a process variable for an open control loop. In other embodiments, startup/shutdown control 218 can be modulated by other compressor operating parameters.

In another embodiment, the processor 212 can be further operable to implement a surge protection algorithm operable to supersede closed loop pressure ratio control, manual valve position control of the portion of the variable flow area, or dynamic control of the portion of the variable flow area. The surge protection algorithm can be implemented to prevent the compressor from operating under surge conditions.

Figure 3:
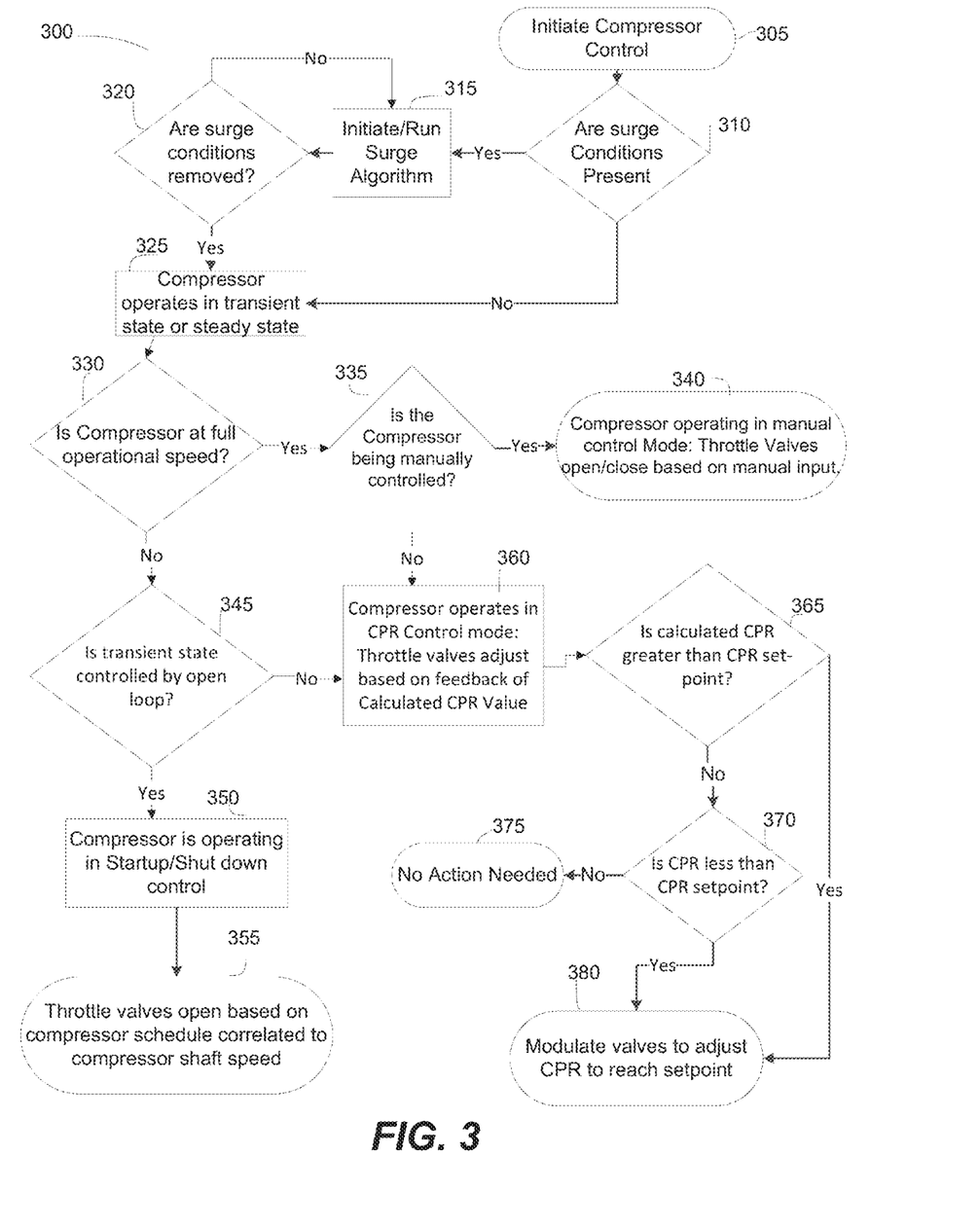
FIG. 3 is a flowchart illustrating an example method according to an example embodiment.

FIG. 3 is a flowchart representing an example method for validating a compressor. The example method 300 can be implemented by either or both systems 100, 200, and some or all of the system components shown in FIGS. 1 and 2. The method 300 begins at block 305, in which compressor control is initiated. Block 305 is followed by decision block 310, in which a determination is made whether surge conditions are present. If determined that the compressor is operating under surge conditions, then YES branch is followed and the method 300 continues at block 315. At block 315, the surge protection algorithm is initiated. At the conclusion of the surge protection algorithm, the method 300 continues to decision block 320. At block 320, a determination is made if surge conditions have been removed. If the surge conditions have not been removed the operation reverts back to initiating the surge protection algorithm at block 315.

Referring back to decision block 310, if surge conditions are not present or if surge conditions have been removed per decision block 320, the NO branch is followed to block 325 and the compressor operates in the transient state or steady state. The transient state characterizes operation when the compressor is operating less than full operation speed and; steady state operation occurs when the compressor is operating at full constant speed. Block 325 is followed by decision block 330, in which a determination is made whether the compressor is operating at steady state speed. If the compressor is operating a steady speed, the YES branch is followed decision block 335, in which a determination is made whether the compressor is being manually controlled. If the compressor is being manually controlled, the YES branch is followed to block 340, in which the compressor is operating in manual control mode, wherein the flow modulating devices are opened and closed using a manual input.

Referring back to decision block 330, if it is determined that the compressor is not operating a full operating speed, the NO branch is followed to decision block 345, wherein the compressor is operating in the transient state. In decision block 345, a determination is made whether the transient state is controlled by an open loop. If the compressor is operating in the transient state under open loop control, the YES branch is followed to block 350, wherein the open loop is regulated by a startup/shut down algorithm. Block 350 is followed by block 355, in which during the startup/shutdown algorithm, throttle valves open based on a compressor schedule directly correlated to the compressor shaft speed.

Referring back to decision block 335, if it is determined that the compressor is not being manually controlled, the NO branch is followed to block 360, in which the compressor operates in a closed loop CPR Control Mode wherein the throttle valves adjust based on the feedback of the calculated CPR process variable. Block 360 is followed by decision block 365, in which a determination is made whether the calculated CPR is greater than the CPR preset value, wherein the calculated CPR is compared to a stored value of CPR. If the CPR is greater than the CPR preset value, the method 300 moves to block 380, wherein the compressor valves modulate to reach the CPR preset value.

Referring back to decision block 365, if a determination is made that the CPR is not greater than CPR preset value, the NO branch is followed to decision block 370, in which a determination is made whether the CPR is less than the CPR preset value. If the CPR is not less than the preset value, the NO branch is followed to block 375, in which the closed control algorithm does not perform an action on the modulating valves. If the CPR is less than the preset value, the YES branch is followed to block 380, in which the compressor valves modulate to reach the CPR preset value.

In other example embodiments of the disclosure, the method 400 can include fewer or greater numbers of operations than those described above, and may be performed in a different sequential order than described above.

Figure 4:
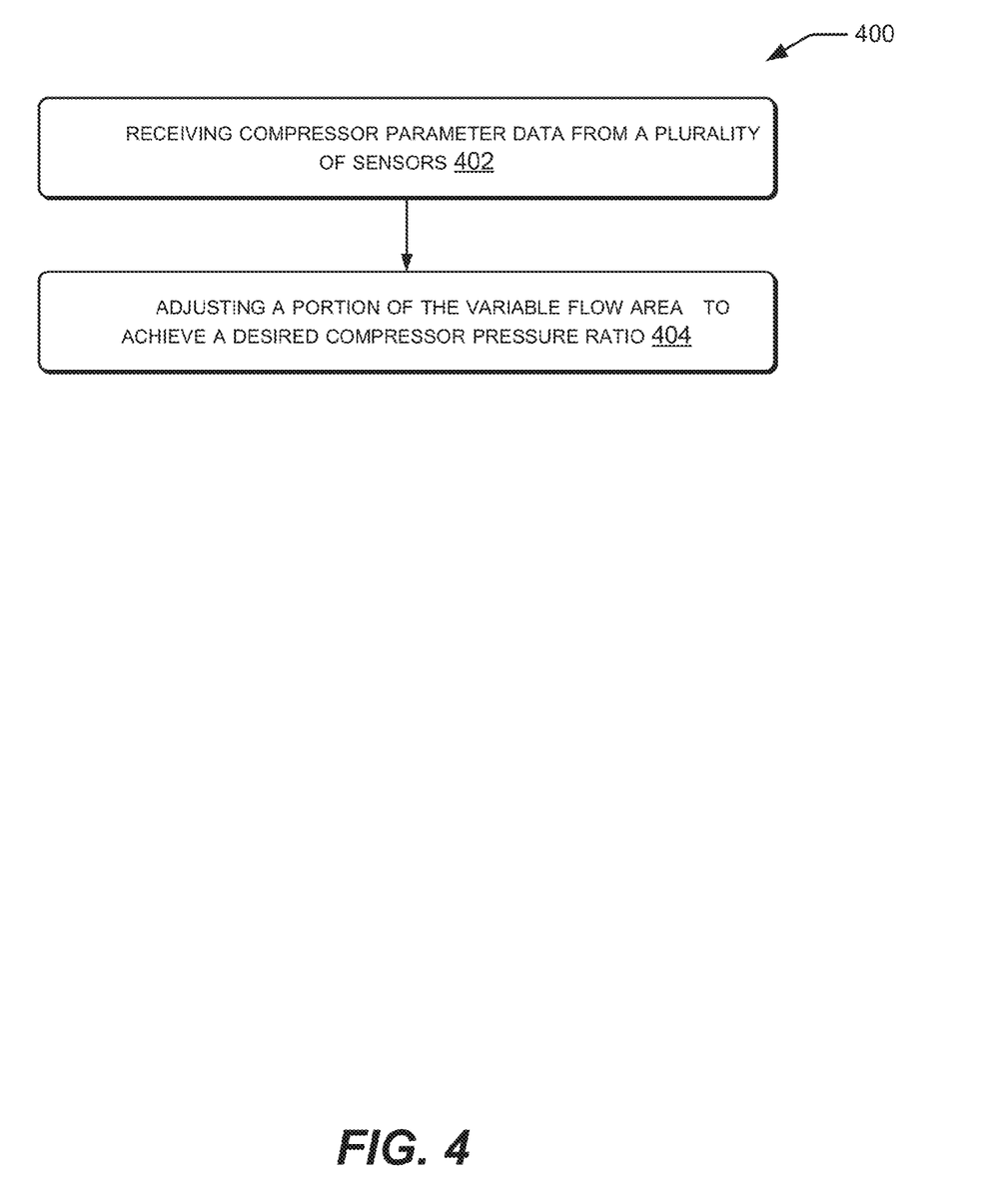
FIG. 4 is a flowchart illustrating another example method according to an example embodiment.

An example method 400 for validating a compressor will now be described with reference to flowchart of FIG. 4. The example method 400 can be implemented by either or both the systems 100, 200, and some or all of the system components shown in FIGS. 1 and 2. The method 400 starts in block 402, and according to an example embodiment of the disclosure, includes receiving compressor operating parameter data from a plurality of sensors.

In block 404, the method 400 includes providing adjusting a portion of a variable flow area downstream of a compressor discharge to achieve a desired compressor pressure ratio or compressor speed.

In one embodiment, adjusting the portion of the variable flow area downstream of the compressor discharge to achieve the desired compressor pressure ratio can include adjusting a throttle device operable to modulate the variable flow area.

In one embodiment, adjusting the portion of the variable flow area downstream of the compressor discharge to achieve the desired compressor pressure ratio can include closed loop pressure ratio control, manual control of the portion of the variable flow area, or dynamic control of the portion of the variable flow area.

In one aspect on an embodiment, the method 400 can further include, based at least in part on detection of a surge event, overriding the closed loop pressure ratio control, manual valve position control of the portion of the variable flow area, or dynamic control of the portion of the variable flow area.

In one aspect of an embodiment, dynamic control can include modulating the compressor shaft speed while performing closed loop control of compressor pressure ratio.

In one embodiment, the method 400 can further include calculating the desired compressor pressure ratio using at least two sensors; and storing the desired compressor pressure ratio.

In one aspect of an embodiment, calculating the desired compressor pressure ratio using at least two sensors can further include calculating an inlet sensor pressure divided by a discharge sensor pressure; or calculating differential pressure between a compressor inlet and a compressor discharge. In other example embodiments of the disclosure, the method 400 can include fewer or greater numbers of operations than those described above, and may be performed in a different sequential order than described above.

References are made to block diagrams of systems, and methods and computer program products according to example embodiments of the disclosure. It will be understood that at least some of the blocks of the block diagrams, and combinations of blocks in the block diagrams, respectively, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus and create means for implementing the functionality of at least some of the blocks of the block diagrams, or combinations of the blocks in the block diagrams discussed.

These computer program instructions may also be stored in a computer readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

One or more components of the systems and one or more elements of the methods described herein may be implemented through an application program running on an operating system of a computer. They also may be practiced with other computer system configurations, including hand-held devices, multiprocessor systems, microprocessor based, or programmable consumer electronics, mini-computers, main computers, etc.

Application programs that are components of the systems and methods described herein may include routines, programs, components, data structures, etc. that implement certain abstract data types and perform certain tasks or actions. In a distributed computing environment, the application program (in whole or in part) may be located in local memory, or in other storage. In addition, or in the alternative, the application program (in whole or in part) may be located in remote memory or in storage to allow for circumstances where tasks are performed by remote processing devices through a communication network.

While certain embodiments of the disclosure have been described in connection with what is presently considered to be the most practical and various embodiments, it is to be understood that the disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosure, including the best modes, and also to enable any person skilled in the art to practice certain embodiments of the disclosure, including making and using any devices or systems and performing any incorporated methods. The patentable scope of certain embodiments of the disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method for validating compressor operation, the method comprising:
   receiving compressor operating parameter data associated with a compressor from a plurality of sensors;
   making a determination whether the compressor is operating in (i) a transient state or (ii) a steady state; and
   adjusting, based on the determination, a portion of a variable flow area downstream of a compressor discharge to achieve a desired compressor pressure ratio comprising:
   (i) dynamic control when the compressor is operating in the transient state or (ii) steady state control when the compressor is operating in the steady state, wherein dynamic control comprises:
   determining whether the compressor is operating in the transient state under (i) open loop control or (ii) closed loop control; and
   adjusting one or more valves based at least in part on: (i) a compressor schedule correlated to the compressor shaft speed when the compressor is operating in the transient state under open loop control or (ii) a calculated compressor pressure ratio when the compressor is operating in the transient state under closed loop control,
   and wherein steady state control comprises:
   determining whether the compressor is not being manually controlled; and
   adjusting the one or more valves based at least in part on the calculated compressor pressure ratio.

2. The method of claim 1, further comprising:
   calculating the desired compressor pressure ratio using at least two sensors; and storing the desired compressor pressure ratio.

3. The method of claim 2, wherein calculating the desired compressor pressure ratio using at least two sensors further comprises: calculating an inlet sensor pressure divided by a discharge sensor pressure; or calculating differential pressure between a compressor inlet and a compressor discharge.

4. The method of claim 1, wherein adjusting the portion of the variable flow area downstream of the compressor discharge to achieve the desired compressor pressure ratio comprises: adjusting a throttle device operable to modulate the variable flow area.

5. The method of claim 4, wherein dynamic control comprises modulating the compressor shaft speed while performing closed loop control of compressor pressure ratio.

6. The method of claim 1, further comprising:
   based at least in part on detection of a surge event, overriding steady state control, manual valve position control of the portion of the variable flow area, or dynamic control of the portion of the variable flow area.

7. A system for validating compressor operation, the system comprising:
   a plurality of sensors operable to receive compressor operating parameter data associated with a compressor;
   a processor operable to receive the compressor operating parameter data; and
   one or more throttling devices operable to modulate a variable flow area downstream from a compressor discharge; wherein the processor further is operable to
   make a determination whether the compressor is operating in (i) a transient state or (ii) a steady state; and modulate, based on the determination, the one or more throttling devices to achieve a desired compressor discharge pressure ratio or compressor speed comprising:
(i) dynamic control when the compressor is operating in the transient state or (ii) steady state control when the compressor is operating in the steady state, wherein dynamic control comprises:
determine whether the compressor is operating in the transient state under (i) open loop control or (ii) closed loop control; and
adjust one or more valves based at least in part on: (i) a compressor schedule correlated to the compressor shaft speed when the compressor is operating in the transient state under open loop control or (ii) a calculated compressor pressure ratio when the compressor is operating in the transient state under closed loop control,
and wherein steady state control comprises:
determine whether the compressor is not being manually controlled; and
adjust the one or more valves based at least in part on the calculated compressor pressure ratio.

8. The system of claim 7, wherein the processor is further operable to receive the compressor operating parameter data, calculate the desired compressor pressure ratio, and store the desired compressor pressure ratio.

9. The system of claim 8, wherein the processor is further operable to calculate the desired compressor pressure ratio comprising at least one of: inlet sensor pressure divided by discharge sensor pressure; or a differential pressure between a compressor inlet and a compressor discharge.

10. The system of claim 7, wherein the one or more throttling devices comprise valves operable to modulate the variable flow area downstream from the compressor discharge.

11. The system of claim 7, wherein the processor is further operable to implement a surge protection mechanism operable to supersede steady state control, manual valve position control of the portion of the variable flow area, or dynamic control of the portion of the variable flow area.

12. The system of claim 7, wherein the processor is further operable to implement dynamic control by modulating the compressor shaft speed while performing closed loop control of compressor pressure ratio.

13. The system of claim 7, wherein the processor is further operable to initiate one or more throttling device adjustments via one or more signals received from a user interface device.

14. The system of claim 7, wherein the plurality of sensors is operable to receive compressor shaft speed data.

15. One or more non-transitory computer-readable media storing computer-executable instructions that, when executed by at least one processor, configure the at least one processor to perform operations comprising:
receiving compressor operating parameter data associated with a compressor from a plurality of sensors;
making a determination whether the compressor is operating in (i) a transient state or (ii) a steady state; and
adjusting, based on the determination, a portion of a variable flow area downstream of a compressor discharge to achieve a desired compressor pressure ratio comprising:
(i) dynamic control when the compressor is operating in the transient state or (ii) steady state control when the compressor is operating in the steady state, wherein dynamic control comprises:
determining whether the compressor is operating in the transient state under (i) open loop control or (ii) closed loop control; and
adjusting one or more valves based at least in part on: (i) a compressor schedule correlated to the compressor shaft speed when the compressor is operating in the transient state under open loop control or (ii) a calculated compressor pressure ratio when the compressor is operating in the transient state under closed loop control,
and wherein steady state control comprises:
determining whether the compressor is not being manually controlled; and
adjusting the one or more valves based at least in part on the calculated compressor pressure ratio.

16. The one or more computer-readable media of claim 15, wherein the operations further comprise:
based at least in part on the inlet pressure data and the discharge outlet data, calculating the desired compressor pressure ratio; and
storing the desired compressor pressure ratio.

17. The one or more computer-readable media of claim 15, wherein the operations further comprise:
based at least in part on detection of a surge event, overriding steady state control, manual control of the portion of the variable flow area downstream from a compressor discharge, or dynamic control of the portion of the variable flow area downstream from a compressor discharge.

18. The one or more computer-readable media of claim 15, wherein the desired compressor pressure ratio comprises compressor discharge pressure divided by compressor inlet pressure.

* * * * *